Patented Oct. 11, 1938

2,132,577

UNITED STATES PATENT OFFICE 2,132,577

METHOD OF PREPARING PECTIN

Aksel G. Olsen, Newtonville, Mass., and Reinhold Stuewer, Battle Creek, Mich., assignors to General Foods Corporation, New York, N. Y., a corporation of Delaware No Drawing. Application August 28, 1934, Serial No. 741,870. Renewed February 5, 1938

23 Claims. (Cl. 99—133)

This invention relates to jellifying substances and more particularly to a pectin prepared from fruit or vegetable material and to a method for preparing the same. The term "pectin" has been and is applied broadly to various substances extracted from such plant material, usually by heat and with or without added acid, which substances are characterized by their ability to form a jelly when dissolved in water with proper proportions of sugar and acid. The term "pectin" is therefore a class designation for such substances and it has been and is applied to different products having this common characteristic without any attempt to differentiate the same. Pectin has been obtained by various workers in the art following different methods of preparation and among the properties attributed to "pectin", as that term has been used in its broad sense, are that it can be precipitated by alcohol, certain metallic salts, acids and sugars. These properties, however, are not common to all of the various substances commonly included within the designation "pectin".

Fremy, J. pharm. Chim (3), 12(1847)13, changed insoluble pectose, now often referred to as protopectin, to pectin by boiling with weak acids. By heating this pectin with dilute acid he caused it to form what he called "parapectin" and "metapectin", the latter possessing the characteristic property of precipitating with $BaCl_2$, an alkaline earth chloride. Parapectin was precipitated with lead acetate but pectin was not. Pectin was very soluble in water but insoluble in alcohol and was not precipitated from its solution by neutral lead acetate. Although these substances were all broadly "pectin", their characteristics differed.

Pectin and pectinous substances occur in many fruits and vegetables and can be extracted therefrom for use in jelly making and for other purposes. In known processes the pectin-containing material is heated with sufficient water, with or without added acid, to produce a fluid mass containing pectin in solution. The resultant pectin solution is then separated from the insoluble pulp by draining and pressing or by other known means. One usual method for extracting the pectin from the solution thus formed is to concentrate the solution and then precipitate the pectin by means of alcohol. Other methods involve precipitation by "salting out" effects and by the formation of colloidal hydroxides in the pectin solution. The character, yield and grade of the pectin obtained are determined by the particular raw material and by the process used, and the interrelationships of time, temperature and pH (hydrogen ion concentration) of extraction and their influence on the resultant product have been studied for pectin, using that term in its broadest sense, in connection with certain of these known processes. Temperature ranging from 50° C. to 100° C. and above, and acidities ranging from about pH 1.2 to 3.0 and higher, have been used.

Another method of preparing pectin involves its precipitation by metallic ions, and this method has advantages from the practical standpoint which render its use desirable. The pectin can be precipitated from dilute solutions so that concentration is unnecessary, and undesirable extraneous substances are not precipitated along with the metallic salt of the pectinous substance; other advantages will appear hereinafter. Fremy discovered that pectin in certain forms can be precipitated from solution by means of an alkaline earth salt, namely $BaCl_2$. The use of a calcium salt, also an alkaline earth salt, is particularly desirable for reasons which will also appear hereinafter, and the following description is directed particularly to a method involving precipitation by calcium, although it will be understood that other metals may be employed for precipitation if desired.

The properties of any particular pectin both with respect to its jellifying characteristics and with respect to its precipitability will depend upon its source and method of preparation. Various pectins which show some like properties, for example, solubility in water and formation of jelly with proper amounts of sugar and acid, will be different in other respects such as their behavior with respect to certain precipitants. For example, a pectin prepared in accordance with Douglas Patent No. 1,082,682, December 30, 1913, will not be precipitated with $CaCl_2$, whereas a pectin prepared by the process to be described hereinafter will be so precipitated. On the other hand, not all pectin or pectinous substances that are precipitable by calcium possess the properties desirable for jelly making. Pectin prepared in accordance with the Douglas patent mentioned above will not take up enough calcium to be precipitated. However, if this pectin is hydrolyzed to pectic acid, calcium pectate is readily formed and precipitated, but pectic acid has no jellifying properties. Between pectin not precipitable by calcium and pectic acid, there is a range wherein pectin having jellifying properties is precipitated by calcium as calcium pectinate. Fremy's method produced certain quantities of "metapectin" which was precipitable by barium chloride, but his method was wasteful in that a large part of the pectin was converted to pectic acid. Furthermore, even in this range of calcium precipitable pectin the jellifying characteristics of the pectin may vary.

One of the objects of the present invention is to provide a practical and efficient method of producing a high grade pectin by precipitation with metallic ions such as calcium ions which process produces a maximum yield of high grade pectin of high purity. The precipitate so obtained is hereinafter designated as pectinate, the salt of pectin, to distinguish it from pectate, the salt of pectic acid.

Another object is to provide a novel method of producing pectin involving as a first step the treatment with heat and mineral acid of the pectin-containing material in an essentially solid state with little free liquid, and as a second step the extraction of the liberated pectin. The first step will hereinafter be referred to as "pickling" and the second step as "extracting."

Another object is to provide a new and practical method of producing pectin precipitable by metallic ions wherein the changes in the pectin can be controlled to restrict conversion to pectic acid and to provide a product having the maximum with the most desirable jellifying properties.

A further object is to provide a new and practical method of producing pectin precipitable by metallic ions which method involves an acid pickling of the pectin-containing material at temperatures below 50° C. preliminary to the extraction of the pectin therefrom.

A still further object is to provide a novel method of producing a pectin precipitable by an alkaline earth salt such as $CaCl_2$ which involves pickling the pectin-containing material with acid in an essentially solid state preliminarily to the extraction of the pectin from the pickled mass.

A process embodying the invention has been described in detail hereinafter, with typical examples by way of illustration, but it will be expressly understood that the details of the following description are for purposes of illustration only and are not to be construed as a definition of the limits of the invention, reference being had to the appended claims for this purpose.

In the manufacture of commercial pectin, dried apple pomace is widely used, this pomace being the residue left after expression of the juice of the apples. For purposes of example, the following description is directed to the treatment of apple pomace, but the process described can be applied to any other suitable pectin-containing material. As obtainable commercially, dried apple pomace is coarse and for the pickling operation to be described is preferably ground. We have found that good results are obtained if the pomace is ground to pass a screen of 4 to 5 mesh and that finer grinding does not produce materialy increased yields. Coarser pomace can be used if desired although some decrease in yield results.

The ground dried pomace is subjected to a pickling process to convert the pectinous substances into calcium-precipitable pectin. This pickling operation consists, briefly stated, in treating the pomace with a suitable mineral acid and heat for a period of time until the desired stage in the conversion of the pectin is reached, the mass being pickled in an essentially solid state wherein there is no free liquid, all of the liquid being absorbed by the dried pomace. The mass is maintained at a temperature below 50° C. for a time much longer than the ordinary cooking time generally used in the art and the acidity or hydrogen ion concentration is kept high. Under these conditions the process is controllable in that the hydrolytic changes from protopectin to pectin to calcium-precipitable pectin and finally to pectic acid or its decomposition products can be controlled and the pickling stopped at any desired stage.

When the pickling operation is carried to the calcium-precipitable pectin stage the conditions necessary are fairly definite. The temperature and time of pickling must be carefully controlled for maximum yields of high grade calcium-precipitable pectin, and temperatures above 50° C. are undesirable because of difficulty of control, as the pomace is easily over-pickled at higher temperatures. Temperature and time are inter-related in the pickling operation, the higher the temperature the shorter the pickling time and vice versa; for example, 45° C. for 36 hours and 33° C. for 92 hours give substantially the same results. If the temperature is materially increased with the same pickling time, or vice versa, the time is increased with the same temperature, the pectin will be overpickled which will be shown by the fact that it precipitates more readily with calcium but has less desirable jelly making properties, particularly in that it tends to jellify too rapidly, forming curdled jellies. If unduly over-pickled pectic acid is produced which is calcium-precipitable but has no jelly making value.

By way of example of the pickling operation, one part of pomace is mixed with two parts of warm dilute HCl containing 1.6 g. HCl per 100 cc. (about 0.45 normal). The final mixture, at a temperature of 40° to 41° C., is placed in covered acid-resistant containers in an insulated room which is held at a temperature of about 40° C. The temperature of the pomace-HCl mixture drops slightly during the time of pickling, which is 46 to 47 hours, to about 39° C. The pH of the pomace-HCl mixture which is essentially solid, is difficult to determine and is about 0.6 to 0.7; the mixture contains 1.06% HCl. The pH of the dilute HCl solution is approximately 0.5. HCl is a mineral acid and the pickling is not limited to the use of HCl only; e. g. $H_2SO_4$ can be used but more of this acid is required to obtain the necessary pH. It will be understood that the acid and other conditions here given are optimum and can be varied while still embodying the principles and obtaining the results of our invention. For example, the acidity may be decreased (higher pH value) but in such case either a higher temperature must be employed which makes it more difficult to control the pickling to the desired stage or a much longer time is required which is undesirable.

The result of the pickling operation is to liberate the pectin from the plant material with which it was combined and to convert it to calcium-precipitable pectin, which is held in the pickled mass from which it must subsequently be extracted. The treatment of the pickled mass for extraction preferably includes dilution of the pickled pomace with water to a weight which may be roughly 15 to 20 times the weight of dried pomace used and heating of the mixture to bring the pectin into solution in the water. Stirring or agitation facilitates the mixing of the water and pickled mass and tends to hasten the solution of the pectin. A temperature of about 75° C. is about the maximum which can be used, because at higher temperatures and at the pH obtained in the extraction tank, about 1.6, the destruction of pectin is very rapid. Temperatures as low as 45° C. have been used with good results.

While the extraction operation may be carried out at the pH resulting from the acidity of the pickled mass and without neutralization, the pH in the extraction operation may be raised to around 2.7 to 3.0 by the addition of any suitable neutralizing agent, e. g. sodium bicarbonate, which will give a high grade pectin and at the same time tends to prevent any further hydrolysis of the pectin. Since the optimum for calcium precipitation is about 4.0 as described hereinafter, the neutralization during extraction is preferably stopped before reaching this pH. Sodium ion has a peptizing effect on pectin, and where sodium bicarbonate is used for neutralization larger amounts of calcium ion are subsequently required to precipitate the pectin. After the water has been heated and the pickled pomace is mixed in, the temperature may be about 60° C. and may be maintained for one hour, after which the pectin solution is removed from the insoluble matter in any suitable way, for example, by pressing. The pectin solution is cooled and filtered and the pectin can then be precipitated from the solution in any known manner but preferably by precipitation with metallic ions and particularly by the use of alkaline earth salts providing the calcium or other ions as described hereinafter. For further processing after extraction, the extract should preferably be cooled below 60° C. to prevent loss of jelly units.

The extraction of the pomace at the pH in the extraction tank would not produce calcium-precipitable pectin without the prior pickling operation. In other words, the extraction operation alone would not suffice and the results of the pickling operation cannot be practically accomplished during the extraction. About 10 times more acid would be necessary to effect the pickling change in the course of extraction and there would be excessive destruction of pectin at the same time. Furthermore, the process would be difficult if not impossible to control properly, because the hydrolytic changes which take place more or less gradually and progressively and relatively slowly under the pickling conditions described above, would take place much more rapidly and under conditions very difficult to control if carried out with quantities of free liquid and in the presence of acid and heat as would be the case in the extraction operation. Hence, the combination of a preliminary pickling and a subsequent extraction is the most practicable, efficient and economical method, being easily controllable and involving the employment of a minimum of mineral acid to obtain desired pH and, producing a maximum yield of high grade calcium-precipitable pectin.

A pH of approximately 4.0 is about right for precipitation, as higher pH tends to give a very dark precipitate with no appreciable increase in yield, and the pectin solution is therefore neutralized to a pH of approximately 4.0 with a suitable alkali. This is preferably accomplished by calcium carbonate when the pectin is to be precipitated with calcium ion. Unless over-pickled the calcium pectinate does not usually precipitate out after such neutralization although at times there may be a tendency for it to do so. Calcium chloride is then added in sufficient quantity to raise the concentration of the calcium ion to force the calcium pectinate out of solution. Although $CaCO_3$ could be used alone to supply the necessary calcium ion, it is preferable to use the $CaCl_2$ as well, to avoid neutralizing further than pH 4.0. The colder the reaction mixture, the more easily is the calcium pectinate precipitated; a temperature of 20° C. to 25° C. is aimed at, as higher temperatures tend to make the precipitate more gelatinous and harder to handle. The amount of calcium chloride to add is readily determined by laboratory tests and factory practice and usually does not exceed the amount of $CaCO_3$ used. However, where neutralization is employed in the extraction, considerably more $CaCl_2$ is used to obtain the desired calcium ion concentration.

After precipitation the calcium pectinate rises to the surface and the mother liquor underneath is drawn off. The precipitate carries a large amount of gas which is released by subjecting the precipitate to a vacuum. This degassing operation facilitates pressing the precipitate, which after draining and pressing is finally dried.

Instead of neutralizing the pectin solution with $CaCO_3$, the pectin can be precipitated with alcohol and put back into solution and then precipitated with $CaCl_2$ without the use of the carbonate. However, neutralization to about pH 4.0 is the more desirable procedure.

The calcium pectinate produced as described above is insoluble as such in cold and hot water without added acid. It contains high ash and its percentage of calcium and ash may vary with variations of raw materials and processing. If this calcium pectinate is used as such in the making of jelly there is a tendency toward premature gelation due to its high ash content. It is therefore desirable to wash the calcium pectinate with acidified alcohol of such concentration that the ash constituents will be readily soluble while the pectin itself will not be soluble, the alcohol being acidified preferably with HCl, to produce a soluble pectin which will dissolve in water without added acid. The ratio of acidified alcohol (for example, 50% alcohol) to calcium pectinate is about 3 to 1 and the acid concentration is about 1.5% HCl, these conditions for washing producing a pectin soluble in water without added acid. The washing may be done in any suitable manner, the calcium pectinate and alcohol being for example mixed and allowed to stand for one hour with occasional stirring, after which the liquor is drawn off preferably on a vacuum filter. The pectin is then washed with 50% alcohol and finally with 95% alcohol and dried in a vacuum dryer.

It is not necessary to remove all calcium to produce a soluble pectin, and the soluble pectin resulting from the washing as described above will contain some calcium or ash. A 1% solution of this pectin has a pH of about 3.0 and if the product is to be kept for long periods of time it is undesirable to wash it further as the removal of more calcium by the use of more acid renders the product less stable.

This soluble pectin shows the usual lumping tendency when mixed with water, due to the fact that pectin is by nature a gum and when wetted tends to form lumps which can be dispersed so as to get the pectin into solution only with much difficulty. Hence, it has heretofore been proposed to mix such soluble pectin with a dispersing agent such as sugar. It has been found that when only part of the calcium is removed, a product is produced which disperses readily in cold water and is sufficiently soluble in hot water for practical use so that the above difficulties can be obviated by properly controlling the washing of the calcium pectinate precipitate. This particular discovery, however, is not part of the present invention and is not claimed specifically herein but is the subject matter of a copending application of Neal M. Beach, Serial No. 741,871, filed Aug. 28, 1934.

It will be understood that the pickling operation herein described may be desirable for other purposes than the production of pectin in such form that it can be precipitated by calcium or the like and therefore that it may be desirable to stop the pickling operation at some other stage than that best suited for calcium precipitation. Furthermore, within the range suitable for calcium precipitation the pickling operation can be stopped at different stages which produce pectins having distinct jellifying characteristics as pointed out above. Under the conditions described, with the mass essentially solid, the temperature low and the hydrogen ion concentration relatively high, the changes in the pectin proceed gradually and relatively slowly so that these changes are controllable and their progress can be stopped at any desired point. This result has not been attainable with acid cooking or extraction processes as heretofore carried out.

It will further be understood that the use of calcium as a precipitant is not essential, although desirable when the pectin is to be used as a food product. The pickled pectin can, however, be precipitated from its solution by salts of other alkaline earths and by other metals such as copper, iron, etc. However, if such other metals are employed as precipitants, it will generally be desirable to remove them from the pectin before use in a food.

Variations in the interrelationships of time, temperature and pH of the pickling operation will readily occur to those skilled in the art to adapt the principles of pickling to different raw material, e. g. beet pulp, turnips, citrus fruits, etc. Various other modifications of details of procedure will suggest themselves to those skilled in the art, within the spirit of the invention and the scope of the appended claims.

What is claimed is:—

1. A method of producing pectin which consists in first pickling pectin-containing material with mineral acid and heat under conditions of time, temperature and acidity of pickling such as to form soluble pectin and then extracting the pickled mass with hot water to remove the soluble pectin.

2. A method of producing pectin which consists in first pickling pectin-containing material with mineral acid at relatively high acidity of the order of pH 1.0 or less and at a temperature below 50° C. and regulating the duration of the reaction to form soluble pectin and then extracting the pickled mass with hot water to remove the soluble pectin.

3. A method of producing pectin which consists in first pickling pectin-containing material with mineral acid and heat to form soluble pectin, the pH of the mass during pickling being less than 1.0, the duration of pickling being regulated with respect to the temperature and changing in inverse sense therewith, and the pickling treatment being continued at the pickling temperature to produce soluble pectin, and then extracting the pickled mass with hot water to remove the soluble pectin.

4. A method of producing pectin which consists in first pickling pectin-containing material with mineral acid, the mass having a pH less than 1.0 and being in essentially solid state with substantially no free liquid, maintaining a temperature not greater than 50° C. during the pickling operation, continuing the pickling treatment for a time sufficient to produce soluble pectin, and then extracting the pickled mass with hot water to remove the soluble pectin.

5. A method of producing pectin which consists in first pickling pectin-containing material with mineral acid at relatively high acidity of the order of pH 1.0 or less, the time and temperature of pickling being between 45° C. for 36 hours and 33° C. for 92 hours, and then extracting the pickled mass with hot water to remove the soluble pectin.

6. A method of producing pectin which consists in first pickling pectin-containing material with mineral acid at a pH less than 1.0, the mass being in essentially solid state with substantially no free liquid, the time and temperature of pickling being between 45° C. for 36 hours and 33° C. for 92 hours, and then extracting the pickled mass with hot water to remove the soluble pectin.

7. A method of producing pectin which consists in first pickling pectin-containing material with mineral acid at a pH less than 1.0, the mass being in essentially solid state with substantially no free liquid, the time and temperature of pickling being between 45° C. for 36 hours and 33° C. for 92 hours, and then extracting the soluble pectin with hot water at a temperature not greater than 75° C.

8. A method of producing pectin which consists in first pickling pectin-containing material with hydrochloric acid at a pH less than 1.0 and for a period of 46 to 47 hours at a temperature from 39° C. to 41° C., the mass being in essentially solid state with substantially no free liquid, and then extracting the soluble pectin with hot water.

9. A method of producing pectin which consists in first pickling pectin-containing material with hydrochloric acid at a pH less than 1.0 and for a period of 46 to 47 hours at a temperature from 39° C. to 41° C., and then extracting the soluble pectin with hot water at a temperature of from 45° C. to 75° C.

10. The method which consists in first pickling pectin-containing material with mineral acid and heat and regulating the duration of pickling with respect to pickling temperature to provide soluble pectin precipitable by a metallic ion, then extracting the soluble pectin by hot water, and then precipitating the pectin from solution by a metallic ion.

11. The method which consists in first pickling pectin-containing material with mineral acid and heat and regulating the duration of pickling with respect to pickling temperature to provide soluble pectin precipitable by an alkaline earth ion, then extracting the soluble pectin by hot water, and then precipitating the pectin from solution by an alkaline earth ion.

12. The method which consists in first pickling pectin-containing material with mineral acid and heat and regulating the duration of pickling with respect to pickling temperature to provide soluble pectin precipitable by calcium ion, then extracting the soluble pectin by hot water, and then precipitating the pectin from solution by calcium ion.

13. The method which consists in first pickling pectin-containing material with mineral acid and heat and regulating the duration of pickling with respect to pickling temperature to provide soluble pectin precipitable by calcium ion, then extracting the soluble pectin by hot water, then neutralizing the pectin solution to about pH 4.0, and then precipitating the pectin from solution by calcium ion.

14. The method which consists in first pickling pectin-containing material with mineral acid and heat and regulating the duration of pickling with respect to pickling temperature to provide soluble pectin precipitable by calcium ion, then extracting the soluble pectin by hot water, then neutralizing the pectin solution to about pH 4.0 by adding calcium carbonate to the solution, and then precipitating the pectin by adding calcium chloride to the solution.

15. A method of obtaining pectin from pectin-containing material which comprises pickling said material with mineral acid and heat, the time and temperature of pickling varying inversely with respect to each other and the pickling treatment being continued at the pickling temperature until the pectin is precipitable from solution by a metallic ion, then extracting the pickled mass with hot water to remove the pectin, and then precipitating the pectin from the solution by adding said metallic ion thereto.

16. A method of obtaining pectin from pectin-containing material which comprises pickling said material with mineral acid and heat, the time and temperature of pickling varying inversely with respect to each other and the pickling treatment being continued at the pickling temperature until the pectin is precipitable from solution by an alkaline earth ion, then extracting the pickled mass with hot water to remove the pectin, and then precipitating the pectin from the solution by adding said alkaline earth ion thereto.

17. A method of obtaining pectin from pectin-containing material which comprises pickling said material with mineral acid at relatively high acidity of the order of pH 1.0 or less, the time and temperature of the pickling varying inversely with respect to each other and the pickling treatment being continued at the pickling temperature until the pectin is precipitable from solution by a metallic ion, then extracting the pickled mass with hot water to remove the pectin, and then precipitating the pectin from the solution by adding the said metallic ion thereto.

18. A method of obtaining pectin from pectin-containing material which comprises pickling said material with mineral acid at relatively high acidity of the order of pH 1.0 or less, the time and temperature of pickling varying inversely with respect to each other and the pickling treatment being continued at the pickling temperature until the pectin is precipitable from solution by an alkaline earth ion, then extracting the pickled mass with hot water to remove the pectin, and then precipitating the pectin from the solution by adding said alkaline earth ion thereto.

19. A method of obtaining pectin from pectin-containing material which comprises pickling said material with mineral acid at relatively high acidity of the order of pH 1.0 or less and at a temperature less than 50° C., and continuing the pickling treatment until the pectin is precipitable from solution by a metallic ion, then extracting the pickled mass with hot water to remove the pectin, and then precipitating the pectin from the solution by adding said metallic ion thereto.

20. A method of obtaining pectin from pectin-containing material which comprises pickling said material with mineral acid at relatively high acidity of the order of pH 1.0 or less and at a temperature less than 50° C., and continuing the pickling treatment until the pectin is precipitable from solution by an alkaline earth ion, then extracting the pickled mass with hot water to remove the pectin, and then precipitating the pectin from solution by adding said alkaline earth ion thereto.

21. A method of producing pectin which comprises first pickling pectin-containing material with mineral acid at relatively high acidity of the order of pH 1.0 or less, the time and temperature of the pickling treatment varying inversely with relation to each other substantially according to the relationships of 92 hours at 33° C. and 36 hours at 45° C., the pickling treatment being continued for a period such as to produce soluble pectin, and then extracting the pickled mass with hot water to remove the soluble pectin.

22. A method of producing pectin which comprises first pickling pectin-containing material with mineral acid with relatively high acidity at the order of pH 1.0 or less, the time and temperature of the pickling treatment varying inversely with relation to each other substantially according to the relationships of 92 hours at 33° C. and 36 hours at 45° C., the pickling treatment being continued for a period until the pectin is precipitable from solution by a metallic ion, then extracting the pickled mass with hot water to remove the pectin, and then precipitating the pectin by adding said metallic ion thereto.

23. A method of producing pectin comprising first pickling pectin-containing material with mineral acid at relatively high acidity of the order of pH 1.0 or less, the time and temperature of the pickling treatment varying inversely with relation to each other substantially according to the relationships of 92 hours at 33° C. and 36 hours at 45° C., the pickling treatment being continued for a period until the pectin is precipitable from solution by an alkaline earth ion, then extracting the pickled mass with hot water to remove the pectin, and then precipitating the pectin by adding said alkaline earth ion thereto.

AKSEL G. OLSEN.
REINHOLD STUEWER.